United States Statutory Invention Registration [19]

[11] Reg. Number: H818

Wagensommer et al. [43] Published: Sep. 4, 1990

[54] ELASTOMERIC COMPOSITIONS (C-1911)

[75] Inventors: Joseph Wagensommer, Westfield; Pawan K. Agarwal, Bridgewater; Ilan Duvdevani, Leonia, all of N.J.

[73] Assignee: Exxon Research & Engineering Co., Florham Park, N.J.

[21] Appl. No.: 34,493

[22] Filed: Apr. 3, 1987

Related U.S. Application Data

[63] Continuation of Ser. No. 807,675, Dec. 11, 1985, abandoned.

[51] Int. Cl.[5] ..... C08C 19/20; C08F 8/34

[52] U.S. Cl. ..... 525/333.9; 525/341

[58] Field of Search ..... 525/331.8

[56] References Cited

U.S. PATENT DOCUMENTS 4,157,432 6/1979 Lundberg ..... 525/344

*Primary Examiner*—Robert L. Stoll
*Assistant Examiner*—Chhaya Sayala
*Attorney, Agent, or Firm*—Richard E. Nanfeldt

[57] ABSTRACT

This invention relates to extrusion and injection moldable type elastomeric compositions having a viscosity at 200° C. at 0.73 $sec^{-1}$ of about $8\times10^4$ to about $8\times10^6$ poises. The compositions used for elastomeric articles include neutralized sulfonated co- and terpolymers of octene-1/ethylene/ENB or sulfonated terpolymers of hexene-1/ethylene/ENB, about 15 to about 200 parts by weight of a non-polar process oil per 100 parts of polymer; about 50 to about 300 parts by weight of a filler per 100 parts of polymer; and a preferential plasticizer at about 1 to about 50 parts by weight per 100 parts of the sulfonated elastomeric polymer. The composition may also include a crystalline polyolefinic thermoplastic at less then about 100 parts per hundred by weight.

These blend compositions can be readily processed due to their superior rheological properties on conventional plastic fabrication equipment into elastomeric articles having excellent physical properties and desirable rubbery characteristics.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELASTOMERIC COMPOSITIONS (C-1911)

This is a continuation of application Ser. No. 807,675, filed Dec. 11, 1985, now abandoned.

FIELD OF THE INVENTION

This invention relates to extrusion and injection moldable type elastomeric compositions having a viscosity at 200° C. at 0.73 $sec^{-1}$ of about $8\times10^4$ to about $8\times10^6$ poises. The compositions used for elastomeric articles include neutralized sulfonated co- and terpolymers of octene-1/ethylene/ENB or sulfonated terpolymers of hexene-1/ethylene/ENB, and optionally about 15 to about 200 parts by weight of a non-polar process oil per 100 parts of polymer; about 50 to about 300 parts by weight of a filler per 100 parts of polymer; and a preferential plasticizer at about 1 to about 50 parts by weight per 100 parts of the sulfonated elastomeric polymer. The composition may also include a crystalline polyolefinic thermoplastic at less than about 100 parts per hundred by weight.

These blend compositions can be readily processed due to their superior rheological properties on conventional plastic fabrication equipment into elastomeric articles having excellent physical properties and desirable rubbery characteristics.

BACKGROUND OF THE INVENTION

Thermoelastic sulfonated polymers have been described in a number of U.S. patents. These sulfonated polymers are derived from polymeric materials having olefinic unsaturation, especially elastomeric polymers such as butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically cross-linked elastomer having substantially improved physical properties over an unsulfonated elastomer at room temperature. However, these ionically cross-linked elastomers may be processed like a conventional thermoplastic at elevated temperatures under a shear force in the presence of selected preferential plasticizers which dissipate the ionic associations at elevated temperatures, thereby creating a reprocessable elastomer.

The basic materials used as neutralizing agents are selected from organic amines or basic materials selected from Groups I, II, III, IV, V, VI-B, VII-B, and VIII and mixtures thereof of the Periodic Table of Elements. Although these sulfonated elastomeric polymers prepared by the process of this patent are readily useable in a certain number of limited applications, they are not as readily adaptable for the manufacture of an extrudable and injection moldable elastomeric article as are the improved compositions of the present invention, wherein both improved physical and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically cross-linked sulfonated elastomers prepared by this process do not exhibit both the improved physical and rheological properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonated groups at a temperature of forming. The compositions formed by this process are not suitable for the manufacture of high performance elastomeric articles formed by extrusion or injection molding processes, as are the compositions of the present invention.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. Again, the composition of the present invention are more adaptable for use in the manufacture of high performance elastomeric articles.

Products resulting from the aforementioned methods for obtaining neutralized sulfonated elastomeric compositions possess either unsuitable rheological or physical properties for the applications envisioned in the present invention.

For example, the physical properties of the resultant sulfonated elastomeric products of these aforementioned patents are unsuitable for a major application of an extrusion process, namely the manufacture of garden hose, wherein excellent resilience, dimensional stability, excellent low and high temperature flexibility, excellent flex fatigue, and excellent coilability are needed. Furthermore, the high melt viscosity and melt elasticity of these materials makes extrusion or injection molding difficult, if not impossible. These materials of the aforementioned patents which are generally processable by only compression molding have unsuitable physical properties for this major application of elastomeric hose articles.

The materials cost of the compositions of the instant invention is substantially reduced over those of the aforementioned patents, wherein these previous patents failed to realize the criticality of the proper selection of the chemical and physical uniqueness of the basic elastomeric backbone, the degree of sulfonation, the proper selection of neutralizing agent in conjunction with plasticization, and the ability to extend these sulfonated polymers with oils and fillers. Unsulfonated elastomers, when extended with oils and fillers, show a general deterioration in physical and rheological properties, as is clearly shown in the Detailed Description of the present invention. Quite suprisingly, through the proper selection of oil and filler within a critical ratio of filler to oil, the sulfonated elastomeric composition of the present invention shows a marked improvement in both rheological and physical properties.

U.S. Pat. Nos. 3,974,240 and 3,974,241, filed on Nov. 18, 1974, describe the blending of a crystalline polyolefinic material with a neutralized sulfonated elastomeric polymer in an attempt to improve both the rheological and physical properties of the elastomeric polymer. The selection of the use of the crystalline polyolefinic material to improve both the stiffness and the melt viscosity of the composition, based in part upon the limitation of the use of fillers, such as carbon black, clays, calcium carbonate or silicates, as a single additive to the elastomeric polymer.

U.S. Pat. Nos. 4,160,751 and 4,169,820, which are incorporated herein by reference, teach thermoplastic compositions of sulfonated EPDM terpolymer. The thermoelastic compositions of the instant invention show improved mechanical properties over the compositions of these patents due to the high molecular weight of the instant sulfonated polymers.

The present invention teaches unique and novel compositions of matter for producing a high performance elastomeric article by an extrusion or injection molding process, wherein the compositions of the elastomeric article have a viscosity of 0.73 $sec^{-1}$ at 200° C. of about $8\times10^4$ to about $8\times10^6$, and a Shore A Hardness of about 50 to 95.

The instant invention describes a class of compounds based on the sulfonated ethylene-hexene-1 or ethylene-octene-1 terpolymers which can be processed on plastics type fabrication equipment at high rates and which possess improved physical characteristics, such as low temperature flexibility and rubbery feel. One of the essential aspects of the present invention is that only a restricted class of the subject sulfonated elastomers may be readily employed for extrusion fabrication. The restrictions are primarily associated with processing and product performance characteristics. These characteristics are to a degree modulated by the type and concentration of various compounding ingredients. The compositions of the instant invention will, therefore, involve a class of compositions based on a restrictive class of sulfonated elastomers.

A substantial segment of the plastics and rubber fabrication industry employs a fabrication technique known as extrusion to form articles which can be classified as sheet, profiles, tubing and film. The applications employing these fabrication techniques, such as windshield wipers, weather stripping, refrigerator door seals, garden hose, etc., require materials which are flexible and tough. Two broad classifications of materials which have been used are vulcanized elastomers and plasticized thermoplastics, such as polyvinyl chloride (PVC). The fabrication of extrusion articles based on vulcanized elastomers is a major item of cost involving the vulcanization procedure. Not only is this step costly from an energy intensive viewpoint, but it is time consuming. The use of plasticating extrusion for thermoplastic materials is more economical and results in high exstrusion rates for materials such as plasticized PVC. While these materials possess a degree of flexibility, they do not have a good rubbery feel or good low temperature flexibility. It is, therefore, desirable to have materials which can be processed on plastics type fabrication equipment at conventional plastics rates and which possess the flexibility and subjective rubbery characteristics of vulcanized elastomers.

GENERAL DESCRIPTION

This present invention relates to unique and novel blend compositions of a neutralized sulfonated elastomeric polymer, and optionally an inorganic filler, and a non-polar process oil, wherein the resultant composition has a viscosity at 0.73 $sec^{-1}$ at 200° C. of about $8\times10^4$ to about $8\times10^6$ poise, wherein the compositions are readily processable in a conventional extrusion or injection molding process into a high performance elastomeric article such as a garden hose. The resultant elastomeric article has excellent low and elevated temperature flexibility, excellent flex fatigue, superior dimensional stability, good resilience, a rubber-like feel, and a Shore A Hardness of about 20 to 95.

Various critically selected additives can be incorporated into the blend compositions, such as a polyolefin thermoplastic, for further modification of hardness, as well as rheological properties, a whitening pigment, an internal lubricant for improvement of the physical appearance, such as shine, of the finished hose article, as well as the ability to easily process the composition during extrusion, and a reinforcing filler such as silica or carbon black, wherein the reinforcing filler constitutes a minor portion of the composition.

The neutralized sulfonated elastomeric polymers of this present invention are sulfonated co-and terpolymers of hexene-1/ethylene/ENB and sulfonated co- and terpolymers of octene-1/ethylene/ENB.

The co- and terpolymers of this invention have a number average molecular weight ($\overline{M}n$) as measured by GPC of about 10,000 to 5,000,000, more preferably of about 15,000 to about 1,000,000, most preferably of about 20,000 to about 500,000. The Mooney viscosity (ML, 1+8, 212° F.) of the co- and terpolymers are about 5 to about 50, more preferably about 7 to about 40, most preferably about 10 to about 30.

The sulfonated co- and terpolymers of the instant invention are formed by the process according to the steps of forming a mixture of an alkane solvent, the octene-1 or hexene-1 monomer, the ethylene monomer and the ENB monomer and diethyl aluminum chloride, reacting the mixture from 0° C. to 60° C.; adding a solution of $TiCl_3$ based catalyst in an alkane to said mixture and stirring for a sufficient period of time to cause terpolymerization; terminating the reaction with isopropanol and precipitating the polymer from the reaction solution.

The sulfonated co- or terpolymer is formed by a direct sulfonation of the co- or terpolymer. The co- or terpolymer is dissolved in a non-reactive solvent, such as a chlorinated aliphatic solvent, chlorinated aromatic hydrocarbon, an aromatic hydrocarbon, or an aliphatic hydrocarbon, such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, most preferably at room temperature for about 5 to about 45 minutes, and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are dioxane, tetrahydrofuran, tetrahydrothoophene or triethyl phosphate. The most preferred sulfonation agent for this invention is an acyl sulfate selected from the group consisting essentially of benzoyl, acetyl, propionyl or butryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone and the ENB portion of the co- or terpolymer is sulfonated. The reaction is quenched with an aliphatic alcohol, such as methanol, ethanol or isopropanol, with an aromatic hydroxyl compound, such as phenol, a cycloaliphatic alcohol, such as cyclohexanol, or with water. The acid form of the sulfonated elastomeric polymer has about 2 to about 60 (meq) of $SO_3H$ groups per 100 grams of sulfonated polymer, more preferably about 5 to about 50, and most preferably about 5 to about 40. The meq of $SO_3H$/100 grams of polymer is determined by both titration of the polymeric sulfonic acid and Dietert Sulfur analysis. In the titration of the sulfonic acid the polymer is dissolved in solvent consisting of 95 parts toluene and 5 parts of methanol at a concentration level of 50 grams per liter of solvent. The acid form is titrated with an ethanolic sodium hydroxide to an Alizarin-Thymolphthalein end-point.

The acid form of the sulfonated co- or terpolymer is gel free and hydrolytically stable. Gel is measured by stirring a given weight of polymer in a solvent comprised of 95 toluene-5-methanol at a concentration of 5 weight percent for 24 hours, allowing the mixture to settle, withdrawing a weighed sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

Neutralization of the acid form of the sulfonated elastomeric polymer is done at the addition of a solution of a basic salt to the acid form of the sulfonated co- or terpolymer dissolved in the mixture of the aliphatic alcohol and non-reactive solvent. The basic salt is dissolved in a binary solvent system consisting of water and/or an aliphatic alcohol. The counterion of the basic salt is selected from antimony, iron, aluminum, lead or Groups I-A, II-A, I-B or II-B of the Periodic Table of Elements and mixtures thereof. The anion of the basic salt is selected from a carboxylic acid having from about 1 to about 4 carbon atoms, a hydroxide or alkoxide and mixtures thereof. The preferred neutralizing agent is a metal acetate, more preferably zinc acetate. Sufficient metal salt of the carboxylic acid is added to the solution of the acid form of the elastomeric polymer to effect neutralization. It is preferred to neutralize at least 95% of the acid groups, more preferably about 98%, most preferably 100%.

Examples of metal oxides useful in preparing metal sulfonates are MgO, CaO, BaO, ZnO, $Ag_2O$, $PbO_2$ and $Pb_3O_4$. Useful examples of metal hydroxides are NaOH, KOH, LiOH, $Mg(OH)_2$ and $Ba(OH)_2$. The resultant neutralized sulfonated terpolymer has a viscosity at 0.73 $sec^{-1}$ at 200° C. of about $2\times10^5$ poises to about $5\times10^7$ poises, more preferably of about $5\times10^5$ poises to about $3.5\times10^7$ poises, and most preferably about $5\times10^5$ poises to about $1.0\times10^7$ poises.

A means of characterizing the apparent molecular weight of a polymer involves the use of melt rheological measurements. For ionic polymers this is the preferred method since solution techniques are difficult to interpret due to the complex nature of the ionic associations. Melt rheological measurements of apparent viscosity at controlled temperature and shear rate can be used as a measure of apparent molecular weight of an ionic polymer. Although the exact relationship between melt viscosity and apparent molecular weight for these ionic systems is not known, for the purposes of this invention the relationship will be assumed to be one of direct proportionality on a logarithmic scale). Thus, in comparing two materials the one with the higher melt viscosity will be associated with the higher apparent molecular weight.

The melt viscosity of the system investigated were determined by the use of an Instron Capillary Rheometer. Generally, the melt viscosity measurements were made at a temperature of 200° C. and at various shear rates corresponding to crosshead speeds from 0.005 in/min to 20 in/min. The apparent viscosity at 200° C. and at a shear rate of 0.73 $sec^{-1}$ is employed as a characterization parameter in this invention. A measure of the melt elasticity of a given system can also be obtained from these rheological measurements. A type of flow instability known as melt fracture is exhibited by many polymeric materials of high molecular weight. This phenomenon is shear sensitive and thus will generally exhibit itself at a given shear rate and temperature. The shear rate for the onset of melt fracture indicates the upper shear rate for processing a given material. This is used as a characterization parameter for compounds employed in extrusion processing.

The metal sulfonate containing co and terpolymers at the higher sulfonate levels possess extremely high melt viscosities and are thereby difficult to process. The addition of ionic group plasticizers markedly reduces melt viscosity and frequently enhances physical properties.

To the acid form or neutralized form sulfonated co- or terpolymer is added, in either solution or bulk, a preferential plasticizer selected from the group consisting essentially of carboxylic acids having about 5 to about 30 carbon atoms, more preferably about 8 to about 22 carbon atoms, or basic salts of these carboxylic acids wherein the metal ion of the basic salt is selected from the group consisting essentially of aluminum, ammonium, lead of Groups I-A, II-A, I-B or II-B of the Periodic Table of Elements and mixtures thereof. The carboxylic acids are selected from the group consisting essentially of lauraic, myristic, palmitic or stearic acids and mixtures thereof, e.g., zinc stearate, magnesium stearate, or zinc laurate.

The preferential plasticizer is incorporated into the neutralized sulfonated elastomeric polymer at about 1 to about 60 parts by weight per 100 parts of the sulfonated co- or terpolymer, more preferably about 2 to about 40, and most preferably at about 4 to about 25. The metallic salt of the fatty acid can also be used as neutralizing agent. In the case of the neutralizing agent and plasticizer being the identical chemical species, additional metallic salt is added over the required levels of neutralization. Alternatively, other preferential plasticizers are selected from organic esters, phenols, trialkyl phosphates, alcohols, amines, amides, ammonium and amine salts of carboxylic acids and mixtures thereof. The preferred plasticizers are selected from fatty acid or metallic salts of fatty acid and mixtures thereof. The resultant neutralized sulfonated co- or terpolymer with preferential plasticizer is isolated from the solution by conventional steam stripping and filtration.

The resultant neutralized and plasticized sulfonated co- or terpolymer has a viscosity at 200° C. and a shear rate of 0.73 $sec^{-1}$ of about $5\times10^4$ poise to about $3\times10^6$ poise, more preferably of about $1\times10^5$ poise to about $8\times10^6$ poise, and most preferably of about $1\times10^5$ poise to about $5\times10^6$ poise.

The neutralized sulfonated co- or terpolymer can be optionally blended with a filler and a non-polar backbone process oil by techniques well known in the art. For example, the blend composition can be compounded on a two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrell Continuous Mixer, a twin screw extruder, or tandem extrusion techniques which are continuous mixing types of equipment. The Banbury mixing device is the preferred batch type mixer, and the twin screw extruder is the preferred continuous mixer.

The fillers employed in the present invention are selected from silicas, talcs, ground calcium carbonate, water precipitated calcium carbonate, or delaminated, calcined or hydrated clays and mixtures thereof. These fillers are incorporated into the blend composition at about 25 to about 350 parts by weight per 100 parts of the co- or terpolymer, more preferably at about 50 to about 350, and most preferably at about 50 to about 300. Typically, these fillers have a particle size of about 0.03 to about 20 microns, more preferably about 0.3 to about 10, and most preferably about 0.5 to about 10. The oil absorption, as measured by grams of oil absorbed by 100 grams of filler, is about 10 to about 100, more preferably about 10 to about 85, and most preferably about 10 to about 75. Typical fillers employed in this invention are illustrated in Table I.

TABLE I

| Filler | Code # | Oil Absorption Grams of Oil/ 100 Grams of Filler | Specific Gravity | Average Particle Size Micron | pH |
|---|---|---|---|---|---|
| Calcium Carbonate Ground | Atomite | 15 | 2.71 | | 9.3 |
| Calcium Carbonate Precipitated | Purecal U | 35 | 2.65 | .03–.04 | 9.3 |
| Delaminated Clay | Polyfil DL | 30 | 2.61 | 4.5 | 6.5–7.5 |
| Hydrated Clay | Suprex | | 2.6 | 2 | 4.0 |
| Calcined Clay | Icecap K | 50–55 | 2.63 | 1 | 5.0–6.0 |
| Magnesium Silicate | Mistron Vapor | 60–70 | 2.75 | 2 | 9.0–7.5 |
| Amorphous Silicate | Imsil A-108 | 30 | 2.65 | 1.1 | 6.8–7.2 |

The oils employed in the present invention are non-polar process oils having less than about 2 weight percent polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3,000 s.s.u.'s at 100° F. and a number average molecular weight of about 300 to about 1,000, and more preferably about 300 to 750. The preferred process oils are paraffinics. Table II illustrates typical oils encompassed by the scope of this invention.

The oils are incorporated into the blend composition at a concentration level of about 15 to about 200 parts by weight per 100 parts of the sulfonated co- or terpolymer, more preferably at about 20 to about 150, and most preferably at about 20 to about 100.

TABLE II

| Type Oil | Oil Code # | Viscosity ssu | $M_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Paraffinic | Tufflo 6056 | 495 | — | 0.0 | 0.9 | 99.1 |
| Aromatic | Flexon 340 | 120 | — | 1.3 | 70.3 | 28.4 |
| Naphthenic | Flexon 765 | 505 | — | 0.9 | 20.8 | 78.3 |

The filler to oil ratio in the present application is critical and should be about 1.25 to about 4.0, more preferably 1.25 to about 3.0, and most preferably about 1.25 to about 2.5.

Various other additives can be incorporated into the blend compositions to improve the physical properties, the appearance, the chemical properties of the formed elastomeric article, or to modify the processability of the blend compositions.

A crystalline polyolefinic thermoplastic can be incorporated into the blend composition in minor proportions as a means for modification of the rheological properties of the blend compositions, as well as the stiffness of the elastomeric article. Typically, the crystalline polyolefinic thermoplastic is added to the blend composition at a concentration level of about 1 to about 100 parts by weight per 100 parts of sulfonated co- or terpolymer, more preferably at about 1 to about 75, and most preferably at about 1 to about 50.

The crystalline polyolefin is characterized as a polymer of an alpha-olefin having a molecular weight of at least 2,000, preferably at least 10,000, and more preferably at least 20,000. This material comprises substantially an olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alpha-olefins. Most preferably the polyolefins are selected from the group consisting of polyethylene, polybutene, polypropylene, and ethylene-propylene copolymers. It is critical that the crystalline polyolefin have a degree of crystallinity of at least 25% and most preferably at least 40%.

Both high and low density polyethylene are within the scope of the instant invention. For example, polyethylenes having a density from 0.90 to 0.97 grams/cc are generally included. Polypropylene polymers having intermediate and high densities are the preferred examples of the polypropylene materials useful in the instant invention. These materials will have a density from 0.88 to 0.925 grams/cc. The polyethylene or polypropylene can also be combined as copolymers thereof so long as adequate crystallinity is obtained in said combination. Thus, block copolymers wherein polyethylene or polypropylene is present in crystalline form are effective.

Zinc oxide can be incorporated into the blend as a whitening pigment, as well as a mean for improving the ionic bonding force between the sulfonate groups in the sulfonated elastomeric polymer. The zinc oxide is incorporated into the blend composition at a concentration level of about 0 to about 25 parts per hundred by weight based on 100 parts of sulfonated polymer, more preferably about 0 to about 15. Alternatively, a Rutile or Anatese titanium dioxide can be employed as a whitening pigment.

A metallic hydroxide can be incorporated into the blend composition as a means of further neutralizing any residual free acid in the elastomeric compositions. The metallic hydroxide is incorporated at a concentration level of about less than 10 parts by weight per 100 parts of the neutralized sulfonated co- or terpolymer, wherein the metal ion of the metallic hydroxide is selected from Group II-A of the Periodic Table of Elements, such as barium, calcium or magnesium.

A lubricant can be employed in the blend composition at a concentration level of about 1 to about 20 parts by weight per 100 parts of the neutralized sulfonated co- or terpolymers, and more preferably about 0 to about 15. The lubricants of the present instant invention are non-polar paraffinic hydrocarbon waxes having a softening point of about 135° F. to about 220° F., more preferably 150° F. to 200° F., wherein the wax has a number average molecular weight of about 1,000 to about 4,000, more preferably 1,500 to 3,500, and less than about 2 weight percent polar constituents. These lubricants modify the rheological properties of the composition, improve the processability in forming the elastomeric article and impart a shine or gloss to the elastomeric article. Additionally, amorphous polypropylene can be used as a lubricant.

Additionally, reinforcing fillers can be added as additives to the blends of sulfonated polymer, filler and oil, wherein the reinforcing filler is selected from the group consisting essentially of fumed silica, carbon black, or calcium silicate and mixtures thereof. These reinforcing agents are generally characterized as having particle sizes below 0.1 microns and oil adsorption above about 100. These reinforcing fillers are incorporated in the blend composition at about 1 to 50 parts by weight per 100 parts of sulfonated co- or terpolymer, more preferably 1 to 25. The ratio of filler to reinforcing agent should be at least about 1, more preferably about 2, most preferably about 3.

The ingredients incorporated into the blend compositions of the present invention, in conjunction with the type of elastomeric polymer, the degree of sulfonation and the metal counterion of the neutralized sulfonated elastomeric polymer and the plasticizer give materials processable by extrusion or injection molding processes into elastomeric articles having the desirable physical and rheological properties. These combined physical properties and rheological processability characteristics were not previously obtainable in the aforementioned U.S. patents and applications previously incorporated herein by reference.

EXAMPLE 1

A. Preparation of Octene-1, Ethylene and ENB Terpolymer

A terpolymer of octene-1, ethylene, and ENB was prepared as follows: The charges were: 2,500 ml of cyclohexane, 500 ml octene-1, 20 ml ENB, and an ethylene feed at a rate of 20 g per hour. The temperature was kept at 25° C. (with nitrogen purge). The catalyst containing 5.81 g of $VCl_4$ and 29.3 g of ethylene-sesquichloride in a hexane solution was added to the reactor at eight increments of fifteen minutes apart. The reaction was terminated four hours after the first increment of catalyst addition by precipitation in 3.5 gallons of isopropanol containing a blend of 30 ml concentrated hydrochloric acid and 70 ml of water. The recovered polymer was purified by redissolving in hot cyclohexane and precipitation in a blend of acetone-isopropanol containing 2 g of Irganox 1010 antioxidant. The polymer was then vacuum dried at 70° C., with a final yield of 105 g. The inherent viscosity in decalin at 135° C. was 0.24.

B. Sulfonation of Terpolymer

The polymer of Example 1A was sulfonated using the following procedure: 103 g of polymer was dissolved in 1,169 g of cyclohexane. Sulfonation was affected by the addition of 20.8 ml of acetyl-sulfate at 28° C. After 30 minutes a neutralization agent containing 10.5 g of zinc-acetate in 120 ml of methanol was added. The polymer was then precipitated in methanol and was vacuum dried at 70° C.

The product contained 15.2 milli-equivalents of sulfonate and 0.73 weight percent of zinc.

EXAMPLE 2

Terpolymerization and Sulfonation of Hexene-1, Ethylene and ENB

A. Polymerization

To a well-stirred 5 liter vessel is added 2,500 ml cyclohexane, 500 ml hexene-1 and 20 ml 5 ethyidene-2 norbornene (ENB), plus an ethylene feed of 20.0 g/hr. Start mixing while purging with nitrogen. Set temperature to 25° C. and add 80 ml DEAC (25 weight percent in hexane) and 24.0 ml $VCl_4$ solution (10 volume percent). Both the $VCl_4$ and the DEAC were injected in eight increments (3.0 ml $VCl_4$ and 10 ml DEAC solution every 15 minutes). After 4 hours the reaction was terminated with isopropylalcohol.

Catalyst was removed (e.g., deashing) as follows:

Catalyst Removal (Deashing)

1st step: mixed cement with 2 1 water+50 ml cc HCl+100 Ml Me-OH.

2nd step: mixed cement with 2 1 water+20 ml cc HCl.

3rd step: washed cement with 2.5 liter water. After deashing the cement was poured in 3.5 gallons of acetone.

The precipitated polymer was vacuum dried at 70° C. A polymer yield of 211 grams was obtained. Inherent viscosity measured for the polymer: 3.36 (in decalin @135° C.).

B. Sulfonation and Neutralization of Terpolymer 210 grams of the polymer from Example 2A was dissolved in 2,500 ml cyclohexane. The terpolymer solution was sulfonated at 35° C. for 1 hour with 20.3 ml acetylsulfate (Ac.ANH/$H_2SO_4$ molar ratio of 3.0). After 1 hour the "free acid" was neutralized with 22 grams of Zn-acetate +90 ml Me-OH +3 ml water for 2 hours. After neutralization the polymer steam precipitated and dried in a vacuum oven at 70° C.

The sulfur content of the polymer was 0.50 weight percent or 16.0 meq. The zinc content of the polymer was 1.06 weight percent.

EXAMPLE 3

Copolymerization and Sulfonation of Octene-1 and Ethylidene-Norbornene

A. Polymerization

Add to a 5 liter well stirred vessel 3,000 ml cyclohexane, 1,000 ml octene-1, and 80 ml 5 ethylidene-2 Norbornene. Start mixing, while purging with nitrogen and cool it to 50° C. At this point add 50 ml diethylaluminum chloride (25 weight percent in hexane) which contains 8.95 g DEAC and 10.0 ml of a modified TiC13 catalyst slurry. The reaction was carefully controlled at 50° C. for 3 hours and then terminated with 3.5 gallons of MeOH +50 ml 2N NaOH +2.0 grams of stabilizer, Irganox-1010.

After drying the polymer the yield was 130 grams and the inherent decalin viscosity (IV) at 135° C. was 5.2.

B. Sulfonation and Neutralization of Copolymer 50.0 grams of this polymer was dissolved in 3,500 ml cyclohexane. The copolymer solution was sulfonated for 30 minutes at 30° C. with 5.5 ml acetylsulfate (AC-.ANH/$H_2SO_4$ molar ratio of 3.0). After 30 minutes the "free acid" was neutralized with 5.3 grams of Zn-acetate, 120 ml MeOH. After 2 hours of neutralization (mixing) the sulfonated polymer was precipitated in MeOH and dried in vacuum at 70° C.

The sulfur content of the polymer was 0.22 weight percent or 7.1 meq. The zinc content of the polymer was 0.33 weight percent.

EXAMPLE 4

Copolymerization and Sulfonation of Hexene-1, Ethylidene-Norbornene

This preparation was similar to Examples 1 and 3. Charges were 3,500 ml cyclohexane, 800 ml hexene-1, 50.0 ml ENB. Start mixing after purging with nitrogen; set temperature to 50° C. and add 50 ml DEAC and 10 ml of a modified $TiCl_{13}$ catalyst slurry. After 2 hours the reaction was terminated by mixing the terpolymer solution with air bubbles. The final terpolymer cement was sulfonated with 10.5 ml acetylsulfate at 28° C. for ½ hour. After 30 minutes we neutralized it with 10.2 g of zinc-acetate in 90 ml MeOH for 1 hour. After neutralization the sulfo-polymer was precipitated in MeOH and vacuum dried at 70° C. The sulfur content of the polymer was 0.43 weight percent of 13.8 meq. The zinc content was 0.41 weight percent.

EXAMPLE 5

Following standard ASTM test (D-343) tensile strength data were taken on two samples, A and B. Sample A was a copolymer of octene-1 and ENB. Its intrinsic viscosity in xylene (at 25° C.) was about 10 and inherent viscosity about 8.5 (in decalin at 135° C.).

Sample B was the zinc neutralized sulfonated product of Sample A. Sulfonation analysis indicated that the sulfonation level of the sample was very low, being about 1.6 milli-equivalents per 100 gm of backbone.

The tensile measurements were carried out on microdumbbells which were cut-outs from compression modeled pads. The data were taken at room temperature with 20 in/min crosshead speed and are shown in Table III.

TABLE III

| | Tensile Properties of Unsulfonated and Sulfonated Octene-1 Copolymers | | | | |
|---|---|---|---|---|---|
| | 100% | 300% | 500% | T.S. (psi) | % Elongation |
| Sample A (unsulfonated polymer) | 13 | — | 27 | 46 | 900 |
| Sample B (sulfonated polymer) | 25 | 45 | 118 | 169 | 590 |

It is clear from these data that Sample A, which is the unsulfonated octene-1 copolymer, has very low tensile strength and high elongation, a typical characteristic of a non-crosslinked elastomer. Sample B, which is sulfonated to a very low level, exhibits tensile strength more than 3 fold over Sample A.

EXAMPLE 6

A thermoplastic compound based on a zinc salt of a sulfonated hexene-1/ENB copolymer (GL-80A) was prepared by mill-mixing. The sulfonated copolymer had 6.9 meq. of sulfur per 100 gram and 0.365 weight percent of zinc. The ingredients of the compound were:

| | |
|---|---|
| Sulfo-Hexene-1/ENB | 100 |
| Zinc Stearate | 10 |
| Oil, Tufflo 6056 | 20 |
| Silica Filler, Imsil A-108 | 50 |
| Antioxidant, Irganox 1010 | 0.2 |

Mill-mixing was done at 150° C. for about 10 minutes and the resulting material was compression molded at 150° C. Microdumbbells were cut for tensile measurements using an Instron tester at a crosshead speed of 2 inches/min. Results were: 100% modulus of psi; elongation at break of about 1700%; and tensile strength of 230 psi.

This material was very elastic and rubbery for its high degree of softness (shore A hardness of 20).

What is claimed is:

1. A sulfonated terpolymer of hexene-1 ethylene/ENB wherein the hexene-1 content of said terpolymer is about 70 to about 99 mole percent and the ethylene content of said terpolymer is about 2 to about 20 mole percent, said sulfonated terpolymer being formed by a solution sulfonation process of said hexene-2/ethylene/ENB.

2. A sulfonated terpolymer of octene-1/ethylene/ENB wherein the octene-1 content of said terpolymer is about 70 to about 99 mole percent and the ethylene content of said terpolymer is about 2 to about 20 mole percent, said sulfonated terpolymer being formed by a solution sulfonation process of said octene-1/ethylene/ENB.

* * * * *